A. F. CRAIG.
Picture.

No. 215,725.    Patented May 27, 1879.

Witnesses:
H. W. Hall
E. C. Weaver

Inventor:
Annie F. Craig

UNITED STATES PATENT OFFICE.

ANNIE F. CRAIG, OF WASHINGTON, DISTRICT OF COLUMBIA.

IMPROVEMENT IN PICTURES.

Specification forming part of Letters Patent No. 215,725, dated May 27, 1879; application filed March 20, 1879.

*To all whom it may concern:*

Be it known that I, ANNIE F. CRAIG, of the city of Washington, and District of Columbia, have invented a new Method of Producing Pictures, of which the following is a specification.

The object of my invention is to obtain a picture of strong life-like appearance, and apparently in relief.

In order to carry out my invention and make these pictures, it is first necessary to provide frames having a back recess of considerable depth and front glass, or I may construct the recess from a shallow box with glass face or top, which may be secured to any ordinary frame. A picture obtained by photography, painting, or outline-cutting is produced on the face-glass of the frame or box. In the case of outline-cutting the picture is secured to the glass by some adhesive substance.

Figure 1:
Figure 2:
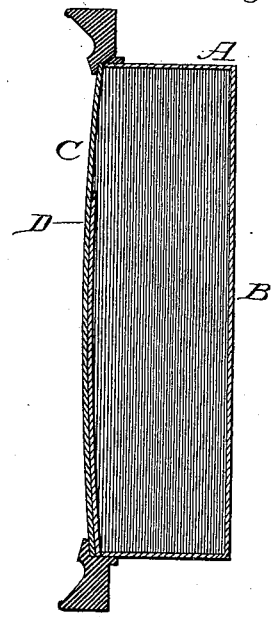

Referring to the accompanying drawings, Figure 1 represents a front view of a recessed frame, A, and front glass C, with a photographic or other picture, D, cemented to or placed upon said glass, and Fig. 2 is a side section of the said frame, showing more distinctly the recess B.

The principal feature of my invention consists in mounting the picture so as to leave an inclosed space back of it, so that when the light falls upon the picture a shadow, E, of same will be thrown upon the background. This background may be on the actual back of the box or on an intermediate slide, and it may be plain or colored, or have on it a representation of landscape, architecture, or other artistic design produced by painting, etching, engraving in relief, or intaglio, or it may be a mirror.

I do not claim a recessed frame or box for holding flowers, and provided with a front glass, because such I know to be old; but Having described my invention, what I claim as new is—

1. The method of mounting and exhibiting flat photographic or other pictures so as to give the appearance of relief, which consists in placing the desired picture on a glass plate, and combining the same with a recessed frame or box in such manner as to have a space of considerable depth between the glass and background, whereby the light falling upon the picture from any point will produce an outline or shadow of the same on the background, substantially as described.

2. The frame A, provided with the recess B, front glass C, and picture D, the latter being attached to said glass, and all arranged so as have an inclosed intervening space between the front glass carrying the picture and the back of said frame or box, substantially as and for the purposes set forth.

ANNIE F. CRAIG.

Witnesses:
M. GARDNER,
V. W. MIDDLETON.